United States Patent
Gaul et al.

(10) Patent No.: US 8,692,513 B2
(45) Date of Patent: Apr. 8, 2014

(54) METHOD AND DEVICE FOR COMMUNICATION BETWEEN AN ELECTRIC VEHICLE AND A CHARGING STATION

(75) Inventors: Armin Gaul, Selm (DE); Ingo Diefenbach, Unna (DE); Markus Heider, Burglengenfeld (DE)

(73) Assignee: RWE AG, Essen (DE)

( * ) Notice: Subject to any disclaimer, the term of this patent is extended or adjusted under 35 U.S.C. 154(b) by 165 days.

(21) Appl. No.: 13/325,904

(22) Filed: Dec. 14, 2011

(65) Prior Publication Data

US 2012/0139489 A1 Jun. 7, 2012

Related U.S. Application Data

(63) Continuation of application No. PCT/EP2010/058302, filed on Jun. 14, 2010.

(30) Foreign Application Priority Data

Jun. 15, 2009 (DE) .......................... 10 2009 025 303

(51) Int. Cl.
*H02J 7/00* (2006.01)
*B60L 9/00* (2006.01)
*B60K 6/20* (2007.10)

(52) U.S. Cl.
USPC .......................... 320/109; 701/22; 180/65.21

(58) Field of Classification Search
CPC ... Y02T 90/14; Y02T 10/1005; B60W 20/00; B60W 10/08
USPC ............................ 320/109; 701/22; 180/65.21
See application file for complete search history.

(56) References Cited

U.S. PATENT DOCUMENTS

| 5,573,090 | A | * | 11/1996 | Ross ................................ 191/10 |
| 2006/0052918 | A1 | * | 3/2006 | McLeod et al. .................. 701/29 |
| 2006/0204004 | A1 | | 9/2006 | Shankar et al. |
| 2007/0123316 | A1 | | 5/2007 | Little |
| 2007/0126395 | A1 | | 6/2007 | Suchar |
| 2008/0015893 | A1 | | 1/2008 | Miller et al. |
| 2010/0010698 | A1 | | 1/2010 | Iwashita et al. |

FOREIGN PATENT DOCUMENTS

| EP | 1 775 654 A1 | 4/2007 |
| EP | 2 196 352 A1 | 6/2010 |
| EP | 2 204 894 A1 | 7/2010 |
| WO | WO 2008/015893 A1 | 2/2008 |
| WO | WO 2009/034877 A1 | 3/2009 |
| WO | WO 2009/034878 A1 | 3/2009 |

OTHER PUBLICATIONS

E DIN IEC 61851-1 (VDE 0122-1); Dec. 2008; 13 pages.

* cited by examiner

*Primary Examiner* — M'Baye Diao
(74) *Attorney, Agent, or Firm* — Reinhart Boerner Van Deuren P.C.

(57) ABSTRACT

A method is described for communication with an electric vehicle, comprising a generating of a first predetermined DC voltage level on a pilot conductor, a recognition of the existence of an electrical connection to an electric vehicle by means of the detection of a second predetermined DC voltage level on the pilot conductor, a sending out of a trigger signal on the pilot conductor, a detection of a vehicle identification signal on the pilot conductor and an approval of the electricity supply on a power conductor.

19 Claims, 4 Drawing Sheets

METHOD AND DEVICE FOR COMMUNICATION BETWEEN AN ELECTRIC VEHICLE AND A CHARGING STATION

CROSS-REFERENCE TO RELATED PATENT APPLICATIONS

This patent application is a continuation of International application No. PCT/EP2010/058302 filed on Jun. 14, 2010, which claims the benefit of German application No. 10 2009 025 303.3 filed on Jun. 15, 2009, the teachings and disclosure of which are hereby incorporated in their entirety by reference thereto.

FIELD OF THE INVENTION

The subject of the present invention relates to a method and a device for communication between an electric vehicle and a charging station, particularly a charging-station-side method, a vehicle-side method, computer program code means, a device for communication with an electric vehicle, a device for communication with a charging station for an electric vehicle, a system for communication between an electric vehicle and a charging station, as well as a vehicle identification signal.

BACKGROUND OF THE INVENTION

The use of electric vehicles promises a solution of many current problems of private transport: the electricity required for their driving can be produced in an environmentally-friendly manner, no exhaust gases are produced at the vehicle itself, the noise pollution is reduced and, due to the principle used, the electric drive itself enables a higher efficiency than an engine which is based on the combustion of fossil fuels.

For the wide use of electric vehicles on a large scale, a simple option for power charging which covers a wide area must also be created in a manner analogous to the known filling station network for liquid fuel. To this end, questions of the billing of a fee for a charging of this type must also be answered. At the current time, although the infrastructure for electricity supply is at least available over a large area, the energy consumption at a socket for example cannot, however, readily be broken down by the respective consumer and determined, limited if appropriate and invoiced on the spot.

In order to make electricity filling stations that can be used by anyone, that is to say publicly useable charging stations, practicable, these must also be as simple to operate as pumps for fluid fuels, however, and also enable an analogously possible limiting and billing of the charging. From the point of view of the vehicle user, as little as possible should therefore change.

SUMMARY OF THE INVENTION

Starting therefrom, the subject of the present invention is based on the object of enabling a use of the charging station for the user of an electric vehicle which comes as close as possible to the use of a pump for fluid fuel.

This object is achieved with respect to the subject by means of a method for communication with an electric vehicle, which method comprises the generating of a first predetermined DC voltage level on a pilot conductor, the recognition of the existence of an electrical connection to an electric vehicle by means of the detection of a second predetermined DC voltage level on the pilot conductor, the sending out of a trigger signal on the pilot conductor, the detection of a vehicle identification signal on the pilot conductor and the approval of the electricity supply on a power conductor.

It has been recognised that modern information technology can be used in order to establish a multiplicity of parameters, which should be determined for the charging process in a sensible manner, automatically by means of communication between the charging station and electric vehicle. That relates on the one hand to an identification of the vehicle to be charged for purposes of billing and preventing the improper misuse and on the other hand to the determination of parameters of the charging current, which take account of the technical data of the individual charging station and of the electric vehicle. This communication takes place in an advantageous manner on the basis of a mechanical and electrically conductive connection between the charging station and the electric vehicle, which can be undertaken comfortably by the user of a charging station in a manner analogous to the introduction of a pump into the filler pipe of a conventional motor vehicle. A data exchange between charging station and electric vehicle is possible on this connection, which data exchange enables a charging in accordance with the technical requirements and a correct billing of the charging amount. At the same time it can be ensured that a higher charging current if appropriate only flows if the connection was produced in the prescribed manner and the necessary approval was issued, as a result of which the risk of damage is minimised.

In the case of the electric vehicle, it can both be a vehicle which has an electric motor exclusively and a vehicle which has both an electric vehicle and an internal combustion engine, such as a diesel engine or another type of motor. The charging station can be both a public stationary charging station and a charging station which is only accessible for a certain group of people. The charging station can also be a mobile charging station. The charging station can draw electricity from an electricity network, store electrical energy in rechargeable batteries or have a generator with which electrical energy can be generated. The connection between charging station and electric vehicle can be produced electromechanically by means of a cable fitting. The cable fitting can be connected securely to the charging station, securely to the electric vehicle or either securely to the charging station or to the electric vehicle. The cable fitting can comprise a multiplicity of individual conductors. In particular, the cable fitting can comprise a power conductor for transmitting the charging current and a pilot conductor. The charging current can be direct current, alternating current or three-phase current.

The generation of a first predetermined DC voltage level on a pilot conductor can take place by means of the applying of a predetermined DC voltage level via a resistor on the side of the charging station on the pilot conductor. Here, this can also be the internal resistance of the device which generates the DC voltage level. Here, the DC voltage level is the DC voltage which results after the subtraction of any signal voltages which are overlaid on the pilot conductor and temporally variable. When producing the electrical connection to the electric vehicle, a connection of the pilot conductor to an earth potential can be present on the vehicle side via a resistor, as a result of which a voltage divider is formed and a second DC voltage level arises on the pilot conductor, which second DC voltage level can be recognised on the side of the charging station.

On the charging station side, a trigger signal can be sent out on the pilot conductor. The trigger signal can be a temporally variable signal which is laid over the DC voltage level on the pilot conductor and does not change the same.

On the charging station side, a vehicle identification signal can be detected on the pilot conductor. The vehicle identification signal can be a temporally variable signal which is laid over the DC voltage level on the pilot conductor and does not change the same. The vehicle identification signal can be encrypted. The vehicle identification signal can comprise information for a clear identification of the electric vehicle attached to the pilot conductor and also comprise further information. The vehicle identification signal can be constructed in accordance with the requirements of a communication protocol.

On the charging station side, the electricity supply can be approved on the power conductor. The approval of the electricity supply on the power conductor can take place by means of the switching on of a switch or a contactor, which connects the power conductor to a voltage source for the electricity supply. The power conductor can be constructed in a manner separate and electrically insulated from the pilot conductor. The power conductor can be comprised in the cable fitting of the pilot conductor. It may be that the power conductor is voltage-free without the approval of the electricity supply. Physical properties of the voltage on the power conductor after the approval of the electricity supply, such as the size of the voltage, frequency, current limiting, output resistance and other properties can depend on the vehicle identification signal detected.

According to an advantageous exemplary embodiment, it is suggested that the method comprises the detection of a temporary predetermined DC voltage change on the pilot conductor, which temporary predetermined DC voltage change is laid over the trigger signal at least to some extent. This can have the technical effect that the receipt of the trigger signal on the pilot conductor is positively acknowledged to the charging station. By means of the overlaying of the DC voltage change onto the trigger signal, the acknowledgement can be detected by the charging station by means of the DC voltage charge without the sending out of the trigger signal having to be previously finished. It may be that a DC voltage change takes place on the pilot conductor a short time after the start of the sending out of the trigger signal on the pilot conductor by means of the charging station, which DC voltage change overlaps temporally with the sending out of the trigger signal at least to some extent and is laid over the trigger signal at least to some extent. The DC voltage change can take place as a reaction to the trigger signal and in the manner of a step function. The DC voltage change can be caused by means of a vehicle-side switching process, for example by means of the parallel switched connection of the pilot conductor to an earth conductor via a further resistor or the switching on of a transistor circuit between the pilot conductor and earth conductor.

According to an advantageous exemplary embodiment, it is suggested that the method comprises the sending out on the pilot conductor of an information signal comprising information about a charging current. This can have the technical effect that the charging station in the electric vehicle can bring about a setting of the charging electronics which is compatible with the characteristics of the charging current delivered by the charging station. For example, the charging station can bring about the switching on of a voltage transformer in accordance with the size of the voltage of the charging current. Thus, the electronics of the electric vehicle can be set to certain data, even before the actual charge current flows.

According to an advantageous exemplary embodiment, it is suggested that the information signal and the trigger signal are in each case pulse-width modulated signals. This can have the technical effect that the generation of the signals, the overlaying of the signals onto the DC voltage level and the detection of the signals can be implemented with simple means. It may be that the upper peak of the pulse-width modulated signal corresponds to the DC voltage level on the pilot conductor. It may be that the lower peak of the pulse-width modulated signal corresponds to a negative voltage. In particular, the lower peak of the pulse-width modulated signal can correspond to a negative voltage with the value of the DC voltage level on the pilot conductor.

In accordance with an advantageous exemplary embodiment, it is suggested that the signal shapes of the information signal and of the trigger signal in each case have at least one parameter which in each case lies in different, non-overlapping value ranges. The frequency range of the information signal and the frequency range of the trigger signal could in each case not be overlapping. The information signal and the trigger signal could, in accordance with a configuration alternative thereto, be modulated to a different carrier frequency in each case via amplitude modulation or frequency modulation.

In accordance with an advantageous exemplary embodiment, it is suggested that the pulse/pause ratios of the information signal and of the trigger signal in each case lie in ranges which do not overlap with one another. This can have the technical effect that the information signal and the trigger signal cannot be confused with one another by the receiving electric vehicle. In particular, the trigger signal can have a pulse/pause ratio of at least 90 percent or at most 5 percent and the information signal can have a pulse/pause ratio in a range between 5 percent and 80 percent.

According to an advantageous exemplary embodiment, it is suggested that the approval of the electricity supply on the power conductor occurs when a third predetermined DC voltage level was detected on the pilot conductor. This can have the technical effect that a positive confirmation of the parameters transmitted with the information signal takes place by means of the electric vehicle before an approval of the electricity supply and as a result a loading of the power conductor with the charging voltage and the charging current takes place. A loading of the power conductor with charging voltage is therefore prevented when there are reasons against it on the part of the electric vehicle. The third predetermined DC voltage level can be caused by means of a vehicle-side switching process, for example by means of the parallel switched connection of the pilot conductor to an earth conductor via a further resistor or by means of the switching on of a further transistor circuit between the pilot conductor and earth conductor.

According to an advantageous exemplary embodiment, it is suggested that the method comprises the interruption of the electricity supply on the power conductor in the case of the detection of a voltage level which is not equal to the third predetermined DC voltage level on the pilot conductor. This can have the technical effect that at the moment at which an active request for an approval of the electricity supply on the power conductor is no longer taking place on the vehicle side, this approval is interrupted and the power divider correspondingly again becomes voltage free. As a result, it is prevented that the electricity supply is also interrupted in the case of a system failure however it is caused. The stopping of the electricity supply therefore does not have to be actively requested, but rather the interruption of the request for the electricity supply is already enough for a stopping of the same.

According to an advantageous exemplary embodiment, it is suggested that the vehicle identification signal is a bipolar signal which comprises information about a position in a cryptographic key, a vehicle identifier which was encrypted in a manner at least partially determined by means of the position in a cryptographic key and at least partially determined by means of the cryptographic key, and information about a cyclic redundancy check of the vehicle identification signal. This can have the technical effect that a secure identification of the electric vehicle by the charging station is enabled. As a result, it becomes possible in turn to call up information stored about this identified electric vehicle or about the type of the identified electric vehicle, which actions allow a parameterisation of the charging current adapted to the respective electric vehicle. In particular, the maximum possible charging voltage, the maximum possible charging current, the maximum charging time, the maximum possible charging time and further parameters can be determined.

According to an advantageous exemplary embodiment, it is suggested that the information about a position in a cryptographic key consists of one byte, wherein the vehicle identifier consists of a sequence of up to thirty two bytes, wherein the information about a cyclic redundancy check consists of two bytes and wherein the vehicle identification signal additionally comprises a start identifier, made up of one byte, with the value 0x01 and information, made up of one byte, on the length of the vehicle identification signal.

A bipolar signal can be a signal which is essentially composed of rectangular signal sequences between an upper voltage value and a lower voltage value. The cryptographic signal can be a sequence with fixed length of characters or bytes which are used in each case for encryption. In particular, one byte of the key can in each case be used for encrypting a byte by means of the application of an exclusive or (XOR) link. The identical cryptographic key can be stored in the charging station and in the electric vehicle. The position in the cryptographic key, information for which position is comprised in the vehicle identification signal, can have been created in a random manner on the vehicle side. The information on a position in the cryptographic key can consist of an index number for the cryptographic key. The position in the cryptographic key, information for which position is comprised in the vehicle identification signal, can indicate the character or the start of a series of characters which were used for encrypting the vehicle identifier or can be used for decrypting the encrypted vehicle identifier. The vehicle identifier can have any desired length in characters or bytes. The vehicle identifier can characterise a special individual vehicle, for example such as in the case of a chassis number, a certain vehicle type or a certain vehicle-side charging device configuration.

The vehicle identifier can be encrypted in such a manner that a unique decryption is either possible completely by means of the knowledge of the cryptographic key and knowledge of a position in the cryptographic key or be encrypted in such a manner that a knowledge of the cryptographic key, a knowledge of a position in the cryptographic key and furthermore the knowledge of further information and the application of further decryption methods is necessary. The information about a cyclic redundancy check of the vehicle identification signal can ensure a fail-safe transmission of the vehicle identification signal. The information about a cyclic redundancy check of the vehicle identification signal can be used for a redundancy check in accordance with the CRC method.

In accordance with an advantageous exemplary embodiment, it is suggested that the vehicle identification signal comprises information about the signal length of the vehicle identifier. This can have the technical effect that vehicle identifiers which are flexibly differently long can be used, as a result of which both identifiers of a special individual vehicle and identifiers of a vehicle type can be use in the case of one and the same charging station. The information about the signal length of the vehicle identifier can be information on the length of the vehicle identifier in characters or in bytes.

In accordance with an advantageous exemplary embodiment, it is suggested that the vehicle identification signal is a pulse-width modulated signal. This can have the technical effect that the generation of the vehicle identification signal is to be implemented with simple means.

A further subject is a method for communication between an electric vehicle and a charging station, wherein the vehicle identification signal is a pulse-width modulated bipolar signal and comprises information about a vehicle identifier which was encrypted in a manner at least partially determined by means of the position in the cryptographic key and at least partially determined by means of the cryptographic key, and information about a cyclic redundancy check of the vehicle identification signal, as well as information about a cyclic redundancy check of a count value, wherein the count value had been previously transmitted to the electric vehicle by means of a generating signal sent out by the charging station. In this case, the generating signal sent out by the charging station contains the count value which can be predetermined by the charging station and information about a position in a cryptographic key, as well as information about a cyclic redundancy check of the generating signal. The count value can for example be the measurement result of the counter itself. The count value can also be a preferably incrementally rising value predetermined by the charging station.

A further subject is a method for communication with a charging station for an electric vehicle, wherein the method comprises the detection of a trigger signal on a pilot conductor, the sending out of a vehicle identification signal on the pilot conductor and the receiving of a charging current on a power conductor.

A further subject is computer program code means which are suitable to execute the method steps of one of the two subject methods.

A further subject is a device for communication with an electric vehicle, which device comprises voltage generation means for the generating of a first predetermined DC voltage level on a pilot conductor, detector means for the recognition of the existence of an electrical connection to an electric vehicle by means of the detection of a second predetermined DC voltage level on the pilot conductor, signal generation means for the sending out of a trigger signal on the pilot conductor, sensor means for the detection of a vehicle identification signal on the pilot conductor and switch means for the approval of the electricity supply on a power conductor.

A further subject is a device for communication with a charging station for an electric vehicle, which device comprises voltage divider means for the generating of a first predetermined DC voltage level on a pilot conductor during the applying of a second predetermined DC voltage level on the pilot conductor, sensor means for the detection of a trigger signal on the pilot conductor, signal generation means for the sending out of a vehicle identification signal on the pilot conductor and charge acceptance means for the acceptance of a charging current on a power conductor.

The voltage divider means can be formed from a resistor or a transistor switch circuit which connects the pilot conductor to an earth conductor and is laid out in such a manner that it results in a DC voltage level on the pilot conductor in the case of the production of an electromechanical connection of the pilot conductor to the charging station and the electric vehicle, which DC voltage level is lower than the DC voltage level on the pilot conductor which existed on the charging station side without a connection to the electric vehicle.

A further subject is a system for communication between an electric vehicle and a charging station, which system comprises voltage generation means for the generating of a first predetermined DC voltage level on a pilot conductor, voltage divider means for generating a second predetermined DC voltage level on the pilot conductor during the applying of the first predetermined DC voltage level on the pilot conductor, detector means for the recognition of the existence of an electrical connection between the charging station and the electric vehicle by means of the detection of the second predetermined DC voltage level on the pilot conductor, first signal generation means for the sending out of a trigger signal on the pilot conductor, sensor means for the detection of a trigger signal on the pilot conductor, second signal generation means for sending out a vehicle identification signal on the pilot conductor, sensor means for detecting a vehicle identification signal on the pilot conductor, switch means for the approval of the electricity supply on a power conductor and charge acceptance means for accepting a charging current on a power conductor.

A further subject is a vehicle identification signal for communication between an electric vehicle and a charging station, which vehicle identification signal is a pulse-width modulated bipolar signal and comprises information about a position in a cryptographic key, a vehicle identifier which was encrypted in a manner at least partially determined by means of the position in the cryptographic key and at least partially determined by means of the cryptographic key, and information about a cyclic redundancy check of the vehicle identification signal.

A further subject is a vehicle identification signal for communication between an electric vehicle and a charging station, which vehicle identification signal is a pulse-width modulated bipolar signal and comprises information about a vehicle identifier which was encrypted in a manner at least partially determined by means of the position in the cryptographic key and at least partially determined by means of the cryptographic key, and information about a cyclic redundancy check of the vehicle identification signal, as well as information about a cyclic redundancy check of a count value, wherein the count value had been previously transmitted to the electric vehicle by means of a generating signal sent out by the charging station. In this case, the generating signal sent out by the charging station contains the count value which can be predetermined by the charging station and information about a position in a cryptographic key, as well as information about a cyclic redundancy check of the generating signal. A yet further improved data transmission security can be achieved by means of such a type of communication. In particular, what thereby results is an improved protection against what are known as "replay attacks", in which a non-authorised user sends out previously recorded or spied data in order to simulate a different identity of an authorised user.

The features of the preferred embodiment can be realised in any desired combination with each individual subject of the invention.

BRIEF DESCRIPTION OF THE DRAWINGS

In the following, the subject is explained in more detail on the basis of drawings which show exemplary embodiments. In the drawing.

DETAILED DESCRIPTION OF THE INVENTION

Figure 1:
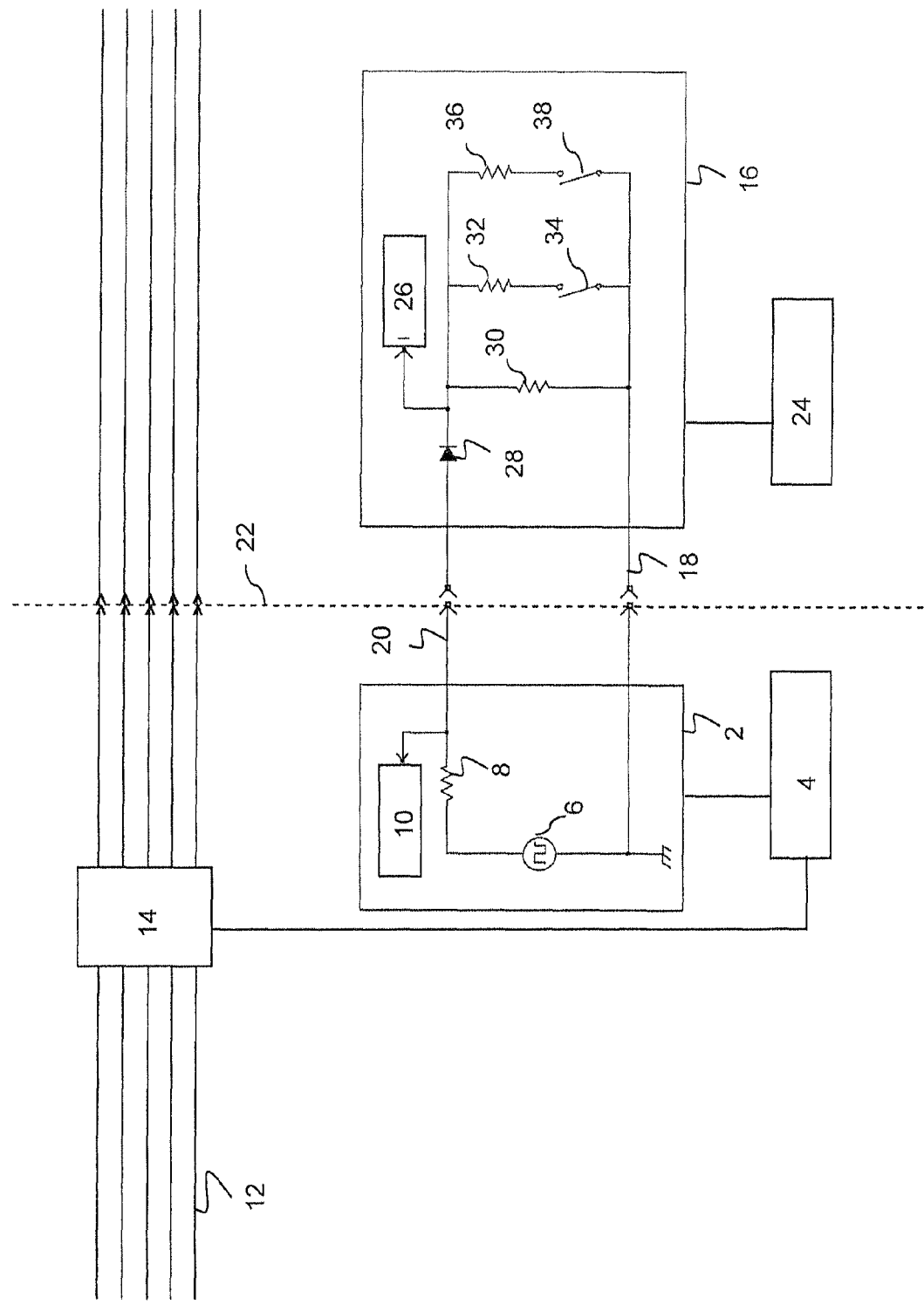
FIG. 1 shows an exemplary construction of a device in an electric vehicle and a device in a charging station for an electric vehicle for mutual communication.

FIG. 1 shows charging electronics 2 on a charging station for electric vehicles which comprise an oscillator voltage source 6, a charging resistor 8 and a voltage measurement device 10, as well as a charging station control device 4 which is connected to the charging electronics 2 and to an isolating switch device 14. The isolating switch device 14 is connected to a power conductor 12 and switches the same. Further, FIG. 1 shows vehicle electronics 16 in an electric vehicle and a vehicle control device 24. The vehicle electronics 16 have a diode 28, a first resistor element 30, a second resistor element 32, a third resistor element 36, a first switch element 34, a second switch element 38 and a measurement device 26. A pilot signal line 20 and a pilot signal earth line 18 lead out of the charging electronics 2. The charging electronics 2 are connected to the vehicle electronics 16 by means of an interface 22 via the pilot signal line 20 and the pilot signal earth line 18. The power conductor 12 likewise leads via the interface 22 into the electric vehicle. FIG. 1 therefore shows a state in which the electric vehicle has been electromechanically connected to a charging station for electric vehicles.

The power conductor 12 and also the pilot signal line 20 and the pilot signal earth line 18 lead via the same cable fitting from the charging station into the electric vehicle. The cable fitting and therefore also the power conductor 12, the pilot signal line 20 and the pilot signal earth line 18 can be unplugged at the interface 22 by means of a plug connection, in order for example to enable a moving away of the electric vehicle and the connection of another electric vehicle to the charging station or of the same electric vehicle at a later point in time.

The arrangement shown in FIG. 1 then allows a supply of the electric vehicle with electrical energy via the power conductor 12 and therefore a charging of storage means for electrical energy in the electric vehicle. The power conductor 12 comprises five lines, specifically one line in each case for the three phases of a three-phase current, as well as one line each for a neutral conductor and an earth conductor. The isolating switch device 14 can switch the connection of the power conductor 12 to the interface 22 on and off. The switch element 14 is controlled by the charging station control device 4 which is also connected to the charging electronics 2. The oscillator voltage source 6 of the charging electronics 2 can generate both a DC voltage and a pulse-width modulated rectangular signal of any desired amplitude on the pilot signal line 20. The oscillator voltage source is controlled by the charging station control device 4. The voltage measurement device 10 enables the determination of a DC and AC voltage amplitude as well as the determination of the pulse/pause ratio and the amplitude of a pulse-width modulated signal. The voltage measurement device 10 can be read from the charging station control device 4.

The first switch element 34 is a transistor circuit and is connected in series to the second resistor element 32. The second switch element 38 is likewise a transistor circuit and is connected in series to the third resistor element 36. These two series connections are in turn connected in parallel to one another and to the first resistor element 30. Controlled by the vehicle control device 24, the vehicle electronics 16 can switch the first switch element 34 and the second switch element 38 on and off individually, independently and, if appropriate, in a pulsed manner. The measurement device 26 enables the determination of a DC and AC voltage amplitude as well as the determination of the pulse/pause ratio and the amplitude of a pulse-width modulated signal. The measurement device 26 can be read from the vehicle control device 24.

Both the vehicle control device 24 and the charging station control device 4 can comprise a microprocessor or a computer on which program code is executed and which determines their mode of operation.

Figure 2A:
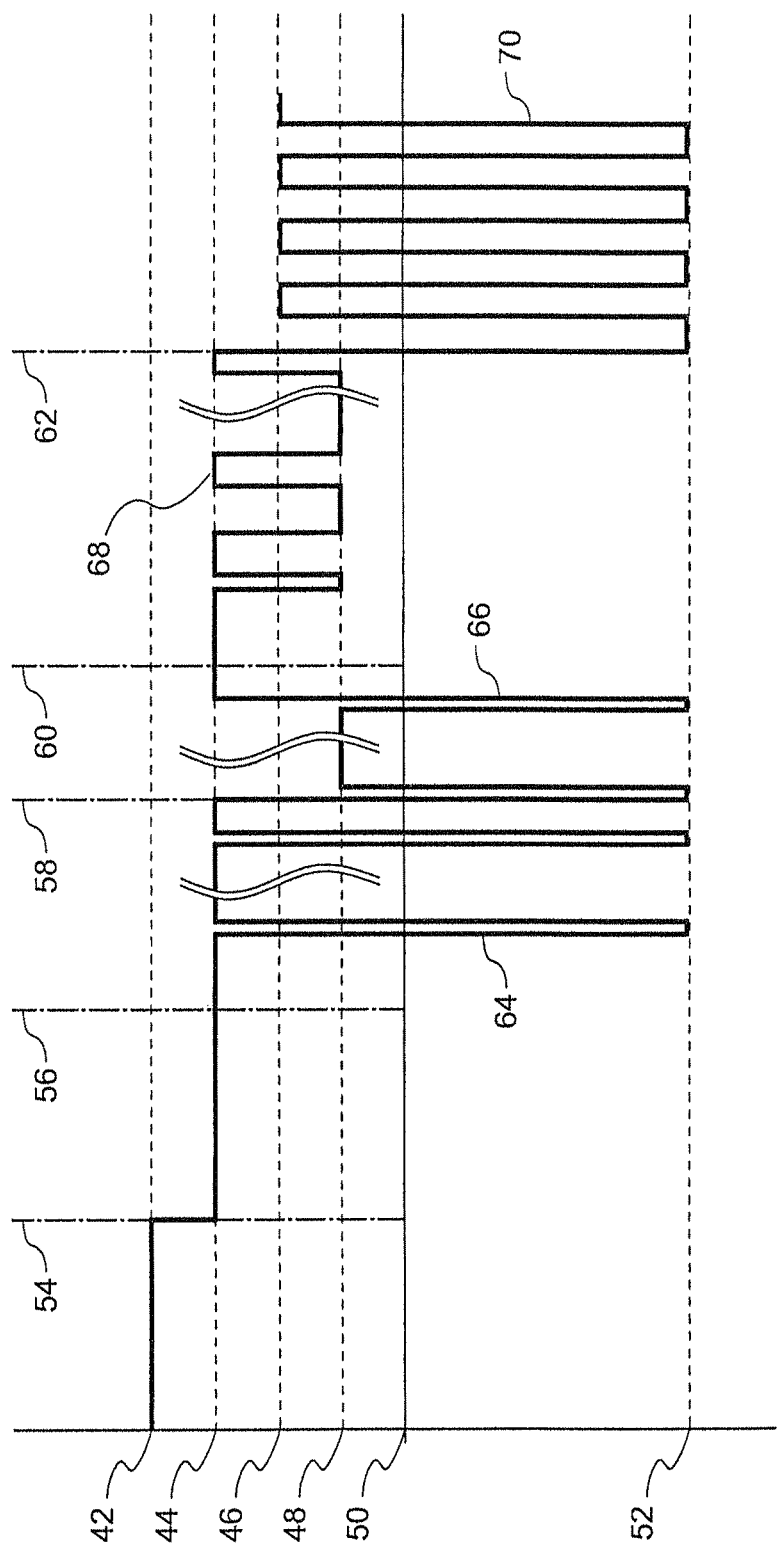
FIG. 2a shows an exemplary voltage progression on the pilot conductor in the case of a first type of communication between an electric vehicle and a charging station for an electric vehicle.
Figure 2B:
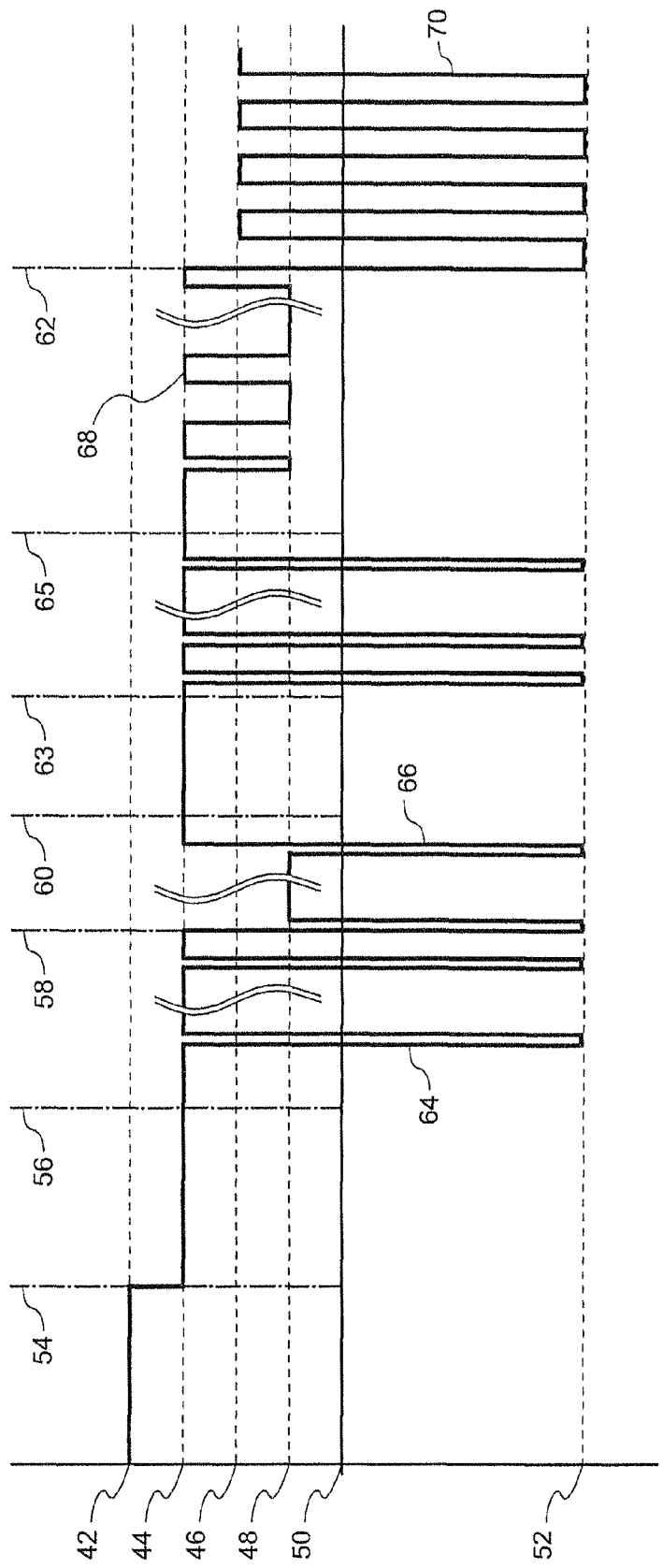
FIG. 2b shows an exemplary voltage progression on the pilot conductor in the case of a second type of communication between an electric vehicle and a charging station for an electric vehicle.
Figure 3:
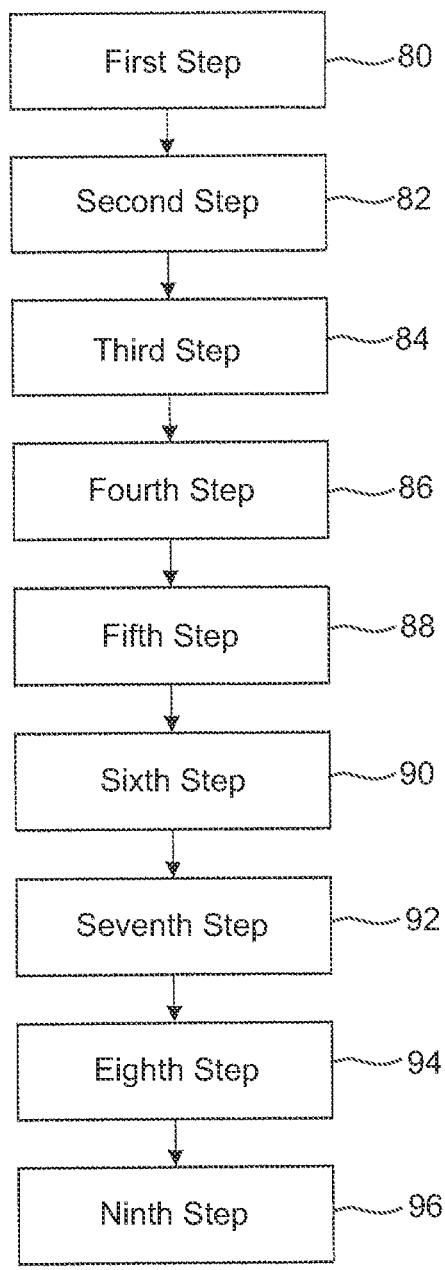
FIG. 3 shows an exemplary flow chart.

Exemplary operational sequences of the communication during a charging process are now described on the basis of FIGS. 2a, 2b and FIG. 3. FIG. 2 here shows the voltage progression and the earth potential 50 on the pilot signal line 20.

In the initial state, an electric vehicle and a charging station for an electric vehicle are not connected to one another. The isolating switch device 14 is open and therefore interrupts the power conductor 12. In a first step 80, the charging station control device 4 recognises that the end-position switch is actuated and brings it about that the oscillator voltage source 6 supplies the pilot signal line 20 with a first DC voltage 42 of twelve volts. The voltage measurement device 10 measures this first DC voltage 42 on the pilot signal line 20. The electric vehicle then approaches for the purpose of charging its store for electrical energy, that is to say its rechargeable batteries. The first switch element 34 and the second switch element 38 are open.

In a second step 82, an electromechanical connection is formed at the time 54 via an interface 22 to a cable fitting between the electric vehicle and the charging station for an electric vehicle. Specifically, there is then an electrically conductive connection via the pilot signal line 20 and the pilot signal earth line 18. The charging resistor 8 and the first resistor element 30 then form a voltage divider with the inclusion of the diode 28, which voltage divider leads to a falling of the DC voltage detected by the voltage measurement device 10 to a second DC voltage level 44 of nine volts, which is lower than the first DC voltage level 42, on the pilot signal line 20. This change of the DC voltage level is measured via the voltage measurement device 10 and communicated to the charging station control device 4 which thereupon recognises at a second time 56 that an electrical connection to an electric vehicle is established.

In a third step 84, the charging station control device 4 then causes the oscillator voltage source 6 to generate a first pulse-width modulated rectangular signal 64 with a predetermined pulse/pause ratio. The pulse/pause ratio can have a first exemplary numerical value of at least 90/10 (90%) or, alternatively thereto, a second exemplary numerical value of at most 5/95 (5%). The upper peak of this first rectangular signal 64 is at the second DC voltage level 44, whilst the lower peak of the first rectangular signal 64 is at a negative voltage level 52 of minus twelve volts.

In a fourth step 86, starting at the third time 58, the measurement device 26 detects the first rectangular signal 64 and forwards the information to the vehicle control device 24. The vehicle control device 24 recognises the signal sent out by the charging station and switches the first switch element 34 on after five hundred milliseconds as a confirmation, as a result of which the second resistor element 32 is connected in parallel to the first resistor element 30. As a result, the DC voltage level, which is identical to the upper peak of the rectangular signal, to which DC voltage level the first rectangular signal 64 was modulated, falls from the second DC voltage level 44 to a third DC voltage level 48 of three volts. Due to the overlapping, a second rectangular signal 66 is produced, which has an identical pulse/pause ratio to the first rectangular signal 64, but has a DC voltage level and therefore an upper peak identical to a third DC voltage level 48. After a further five hundred milliseconds, the vehicle control device 24 causes a switching off of the first switch element 34, as a result of which the second resistor element 32 is no longer connected in parallel to the first resistor element 30. The voltage measurement device 10 in the charging electronics 2 recognises these two switching operations by the described change of the DC voltage level and signals this to the charging station control device 4. The charging station control device 4 recognises this and causes the oscillator voltage source 6 to send no pulse-width modulated rectangular signal, but rather to supply the pilot signal line 20 only with a first DC voltage 42 again, which leads by means of the described voltage divider to a measured second DC voltage 44 on the pilot signal line 20.

Alternatively, in the fourth step 86, the vehicle control device 24 can start a communication via electricity supply lines with the dynamic host configuration protocol.

In a fifth step 88, starting from the fourth time 60, the vehicle control device 24 recognises the absence of a pulse-width modulated rectangular signal by means of the measurement of the measurement device 26. The vehicle control device 24 then generates a third pulse-modulated signal 68 by means of a pulse-modulated switching of the first switch element 34 itself. The third pulse-width modulated signal 68 comprises an identification message of the electric vehicle to the charging station.

The identification message consists of a sequence of bytes with variable length and therefore variable overall length of the message in bytes. The individual bytes are in each case encoded by means of the pulse-width modulation. The identification message is structured as follows: A start identifier consisting of a single byte with the value 0x01 is transmitted first. Next follows a further individual byte which specifies an index for a key. This index was determined by the vehicle control device 24 in a random manner.

This key is a sequence of 256 bytes and is stored in an identical manner both in the vehicle control device 24 and in the charging station control device 4. The index specifies at which position the byte with which the encryption or decryption as described in the following should start is located in the key.

Thirdly, a further individual byte is then sent, which specifies the overall length of the message sent. The overall length of the message is composed of a byte for the start identifier, one byte for the key index, one byte for the specification of the length, a variable number of bytes for the vehicle identifier and two bytes for the cyclic redundancy check.

The byte which specifies the overall length of the message sent is the first encrypted byte of the message. The encryption takes place in that each individual bit of the byte to be encrypted is linked to the respective bit of the byte in the key by means of an exclusive or operation (EXOR operation). The decryption takes place accordingly by means of the reversal of this process. After every encryption or decryption of a byte, the byte at the next index position of the key is used for the respective next encryption or decryption. After using the last byte in the key, it starts again with the first byte.

Fourthly, the identifier of the vehicle is likewise transmitted in a bytewise encrypted manner. The identifier identifies the electric vehicle or the owner of the electric vehicle clearly.

The charging station device 4 then has the option, after the decryption has taken place, to access information stored for the identifier received from this identifier. This information can be stored in the charging station control device 4 itself or be requested from another place by the charging station control device 4 via a further communication connection, which is not shown here. This information can comprise both the charging authorisation of the electric vehicle and different technical parameters of the electric vehicle, such as the maximum charging current, maximum electricity storage capacity, the number of charging cycles already carried out and many more.

Finally, two bytes are fifthly likewise transmitted in a byte-wise encrypted manner, which bytes form a checksum for a cyclic redundancy check of the message received. The evaluation of the vehicle identifier depends on the successful cyclic redundancy check of the overall message on the basis of the checksum received.

If it was possible to identify the received identifier correctly and a successful check could take place, the process continues with a sixth step 90.

In the case of an identification which is not correct, the charging station control device 4 causes a return in the operational sequence to the second step 82. If a check of the identifier fails three times in a row in the fifth step 88, then the charging station control device 4 generates a log entry with an error message and waits for the electromechanical connection to the electric vehicle to be released which can be recognised by the first DC voltage level 42 on the pilot signal line 20 before it is possible to start again with the first step 80.

In the sixth step 90, starting from the fifth time 62, the charging station control device 4 sends a fourth pulse-width modulated rectangular signal 70 by means of the oscillator voltage source 6. This fourth pulse-width modulated rectangular signal 70 constitutes an information signal which comprises information about a charging current. It encodes the highest possible charging current intensity for this electric vehicle, taking account of technical network limitations. The fourth pulse-width modulated rectangular signal 70 has a pulse/pause ratio which ranges between fifty and eighty percent. Consequently, the fourth pulse-width modulated rectangular signal 70 can already be differentiated clearly from the first pulse-width modulated rectangular signal 64 on the basis of the pulse/pause ratio. The highest possible charging current intensity can arise from data stored locally for this identifier or from data which were received from an external place during the check of the identifier. In the case of technical network limitations, for example due to high utilisation peaks elsewhere, a limitation of the possible charging current below the value fundamentally supported by the electric vehicle can arise. The fourth pulse-width modulated rectangular signal 70 is received by the vehicle control device 24 by means of the measurement device 26 and, if appropriate, the information contained therein is used for a corresponding configuration of the charging device of the electric vehicle. The vehicle control device 24 in turn causes the continuous switching on of the second switch element 38. The parallel connection of the third resistor element 36 to the first resistor element 30 thereby forms a voltage divider with charge resistor 8, as a result of which the DC voltage level on the pilot signal line 20 reaches a fourth DC voltage level 46 of six volts. This fourth DC voltage level 46 therefore also forms the upper peak of the fourth pulse-width modulated rectangular signal 70.

In the seventh step 92, in the case of the recognition of the fourth DC voltage level 46 by the voltage measurement device 10 on the pilot signal line 20, the charging station device 4 causes the activation, e.g. the switching on of the isolating switch device 14, as a result of which the power conductor 12 is loaded with voltage and the charging process is approved. The electric vehicle can then charge its electrical energy store by means of the power conductor 12 guided via the interface 22.

If, in a ninth step 96, the charging station control device 4 then determines by means of the voltage measurement device 10 that a DC voltage which is different from the fourth DC voltage level 46 is present on the pilot signal line 20, then the charging station control device 4 interrupts the isolating switch element 14, as a result of which the power conductor again becomes voltage free on the electric vehicle side during this ninth step 96. This can for example take place in that the vehicle control device 24 switches off the second switch element 38 again after the completion of the charging process in an eighth step 94. It can also take place in an eighth step 94 by means of external intervention however, for example by means of a separation of the cable fitting at the interface 22, by means of a triggering of the end position switch or by means of an occurring failure of the vehicle control device 24. In all cases of a malfunction, the DC voltage level on the pilot signal line 20 deviates from the fourth DC voltage level 46, as a result of which an interruption of the isolating switch element 14 is effected. The functionality of an emergency off switch is thereby ensured.

FIG. 2b shows the voltage progression and the earth potential 50 on the pilot signal line 20 according to a second type of communication between a charging station and an electric vehicle. The exemplary embodiment shown in connection with FIG. 2b corresponds in all details to the previously described operational sequence with respect to the reference numbers matching FIG. 2a, particularly with respect to the operational sequence up to the reaching of the fourth time 60 and in turn from the sending out of the third pulse-width modulated signal 68.

Whilst however according to the first exemplary embodiment according to FIG. 2a, the third pulse-width modulated signal 68 is generated directly by means of the vehicle control device 24, after the vehicle control device 24 has recognised the absence of a pulse-width modulated rectangular signal at the fourth time 60 by means of the measurement of the measurement device 26, the following alternative communication manner is provided in accordance with the operational sequence shown in FIG. 2b: At the fourth time 60, after the recognition of the absence of a pulse-modulated signal, a predetermined delay time, for example with a duration of 200 ms, enters into effect, without a message of any type being sent. If the measured signal level on the pilot signal line 20 has not changed with respect to the second level after this delay time has run out at time 65, in particular no further trigger signal had been sent out by the charging station, a generating signal is sent out to the electric vehicle by the charging station. The time period during which this generating signal is transmitted by the charging station to the electric vehicle extends from the time 63 to the time 65 in FIG. 2b.

This generating signal consists of a sequence of bytes with a predetermined number. The individual bytes are in each case encoded by means of pulse-width modulation. The generating signal is structured as follows: A start identifier consisting of a single byte with the value 0x01 is transmitted first. Next, follows a predetermined number of bytes which contain a counter number in the form of a server ID. The server ID can for example signify a certain charging station. Thereafter, a predetermined number of bytes is transmitted, which bytes correspond to a count value. This count value can for example be predetermined as an incrementally rising or falling numerical value by the charging station. Next follows a further individual byte which specifies an index for a key. This index was determined by the vehicle control device 24 in a random manner. This key is, as described in connection with the exemplary embodiment according to FIG. 2a, a sequence of 256 bytes and can be stored in an identical manner both in the vehicle control device 24 and in the charging station control device 4. Alternatively thereto, this key can be inserted as what is known as an "internal key" during the production of the identification module and cannot be read out itself. An "internal key" of this type can be a further key which is provided additionally to the key which is already stored as equal in the modules present and therefore known to charging station and vehicle. This further key ("internal key") is constructed in the manner of a PIN (personal identification number) as belonging to the contract ID and is never transmitted directly in the method described, but rather always only consulted in the case of the formation of a hash value. Finally, two bytes (CRC-16) are transmitted, which bytes form a checksum for a cyclic redundancy check of the message received.

Directly subsequent to the transmission of the generating signal to the electric vehicle, starting with the time 65, the vehicle identification signal is transmitted by the electric vehicle to the charging station. This essentially consists of the signal described in connection with FIG. 2a, however with the difference that the index for a key is absent, as this information was already contained in the generating signal transmitted previously by the charging station.

The identification message according to the exemplary embodiment FIG. 2b is therefore composed of a byte for the start identifier, a byte for the specification of the length, a variable number of bytes for the vehicle identifier, two bytes for the cyclic redundancy check via the count value and the cryptographic key, as well as two further bytes for the cyclic redundancy check.

In contrast with the communication manner according to FIG. 2a, in which the index to the cryptographic key is transmitted in the context of the identification message transmitted by the electric vehicle, according to FIG. 2b the generating of the index to the cryptographic key takes place on the part of the charging station with the taking into consideration of the count value transmitted by the charging station in an encrypted manner. A procedure of this type offers a particular advantage in the case of protection against what are known as "replay attacks", in which a non-authorised user sends out previously recorded or spied data in order to simulate a different identity, namely that of an authorised user.

The invention claimed is:

1. A method for communication with an electric vehicle, comprising:
    generating of a first predetermined DC voltage level on a pilot conductor,
    recognition of the existence of an electrical connection to an electric vehicle by means of the detection of a second predetermined DC voltage level on the pilot conductor,
    sending out of a trigger signal on the pilot conductor,
    wherein the trigger signal is laid over the second predetermined DC voltage level on the pilot conductor,
    detection of a vehicle identification signal on the pilot conductor and
    approval of the electricity supply on a power conductor.

2. A method for communication with a charging station for an electric vehicle, comprising:
    generating of a first predetermined DC voltage level on a pilot conductor,
    recognition of the existence of an electrical connection to the electric vehicle by means of the detection of a second predetermined DC voltage level on the pilot conductor,
    sending out of a trigger signal on the pilot conductor,
    wherein the trigger signal is laid over the second predetermined DC voltage level on the pilot conductor,
    detection of a trigger signal on the pilot conductor,
    sending out of a vehicle identification signal on the pilot conductor,
    detection of the vehicle identification signal on the pilot conductor,
    approval of the electricity supply on a power conductor and receiving of a charging current on the power conductor.

3. A device for communication with an electric vehicle, comprising:
    voltage generation means for the generating of a first predetermined DC voltage level on a pilot conductor,
    detector means for the recognition of the existence of an electrical connection to an electric vehicle by means of the detection of a second predetermined DC voltage level on the pilot conductor,
    signal generation means for the sending out of a trigger signal on the pilot conductor,
    wherein the trigger signal is laid over the second predetermined DC voltage level on the pilot conductor,
    sensor means for the detection of a vehicle identification signal on the pilot conductor and
    switch means for the approval of the electricity supply on a power conductor.

4. The device according to claim 3, wherein the detector means are suitable for detecting a temporary predetermined DC voltage change on the pilot conductor, which DC voltage change is laid over the trigger signal at least to some extent.

5. The device according to claim 3, wherein the signal generation means are suitable for the sending out on the pilot conductor of an information signal comprising information about a charging current.

6. The device according to claim 5, wherein the signal shapes of the information signal and of the trigger signal in each case have at least one parameter which in each case lies in different, non-overlapping value ranges.

7. The device according to claim 5, wherein the information signal and the trigger signal are in each case pulse-width modulated signals.

8. The device according to claim 7, wherein the pulse/pause ratios of the information signal and of the trigger signal in each case lie in value ranges which do not overlap.

9. A device for communication with an electric vehicle, comprising:
    voltage generation means for the generating of a first predetermined DC voltage level on a pilot conductor,
    detector means for the recognition of the existence of an electrical connection to an electric vehicle by means of the detection of a second predetermined DC voltage level on the pilot conductor,
    signal generation means for the sending out of a trigger signal on the pilot conductor,
    sensor means for the detection of a vehicle identification signal on the pilot conductor,
    switch means for the approval of the electricity supply on a power conductor, wherein the vehicle identification signal is a bipolar signal which comprises:
    information about a position in a cryptographic key,
    a vehicle identifier which was encrypted in a manner at least partially determined by means of the position in the cryptographic key and at least partially determined by means of the cryptographic key, and information about a cyclic redundancy check of the vehicle identification signal.

10. The device according to claim 9, wherein the information about a position in a cryptographic key consists of one byte, wherein the vehicle identifier consists of a sequence of up to thirty two bytes, wherein the information about a cyclic redundancy check consists of two bytes and wherein the vehicle identification signal additionally comprises:
- a start identifier, made up of one byte, with the value 0x01 and
- information, made up of one byte, on the length of the vehicle identification signal.

11. The device according to claim 9, wherein the information about a position in a cryptographic key is obtained from a message previously transmitted by the charging station to the electric vehicle, particularly with the taking into account of a preferably encrypted count value transmitted by the charging station.

12. A device for communication with a charging station for an electric vehicle, comprising:
- voltage divider means for the generating of a first predetermined DC voltage level on a pilot conductor during the applying of a second predetermined DC voltage level on the pilot conductor,
- sensor means for the detection of a trigger signal on the pilot conductor,
- wherein the trigger signal is laid over the second predetermined DC voltage level on the pilot conductor,
- signal generation means for the sending out of a vehicle identification signal on the pilot conductor and
- charge acceptance means for the acceptance of a charging current on a power conductor.

13. A system for communication between an electric vehicle and a charging station, comprising:
- voltage generation means for the generating of a first predetermined DC voltage level on a pilot conductor,
- voltage divider means for generating a second predetermined DC voltage level on the pilot conductor during the applying of the first predetermined DC voltage level on the pilot conductor,
- detector means for the recognition of the existence of an electrical connection between the charging station and the electric vehicle by means of the detection of the second predetermined DC voltage level on the pilot conductor,
- first signal generation means for the sending out of a trigger signal on the pilot conductor,
- sensor means for the detection of a trigger signal on the pilot conductor,
- wherein the trigger signal is laid over the second predetermined DC voltage level on the pilot conductor,
- second signal generation means for sending out a vehicle identification signal on the pilot conductor,
- sensor means for detecting a vehicle identification signal on the pilot conductor,
- switch means for the approval of the electricity supply on a power conductor and
- charge acceptance means for accepting a charging current on the power conductor.

14. A vehicle identification signal for communication between an electric vehicle and a charging station, which vehicle identification signal is a pulse-width modulated bipolar signal and comprises:
- information about a position in a cryptographic key,
- a vehicle identifier which was encrypted in a manner at least partially determined by means of the position in the cryptographic key and at least partially determined by means of the cryptographic key, and
- information about a cyclic redundancy check of the vehicle identification signal.

15. The vehicle identification signal according to claim 14, wherein the information about a position in a cryptographic key consists of one byte, wherein the vehicle identifier consists of a sequence of up to thirty two bytes, wherein the information about a cyclic redundancy check consists of two bytes and wherein the vehicle identification signal additionally comprises:
- a start identifier, made up of one byte, with the value 0x01 and
- information, made up of one byte, on the length of the vehicle identification signal.

16. The vehicle identification signal according to claim 14, wherein the information about a position in a cryptographic key is obtained from a message previously transmitted by the charging station to the electric vehicle.

17. The vehicle identification signal according to claim 16, wherein the information about a position in a cryptographic key is obtained with the taking into account of a particularly encrypted count value transmitted by the charging station.

18. The vehicle identification signal according to claim 16, which is composed of a byte for the start identifier, a byte for the specification of the length, a variable number of bytes for the vehicle identifier, two bytes for the cyclic redundancy check via the count value and the cryptographic key, as well as two further bytes for the cyclic redundancy check.

19. The vehicle identification signal according to claim 14, wherein the cryptographic key is a further internal key which is assigned to the user of the vehicle in the manner of a PIN.

* * * * *